United States Patent
Hasegawa et al.

(10) Patent No.: US 7,056,595 B2
(45) Date of Patent: Jun. 6, 2006

(54) MAGNETIC IMPLEMENT USING MAGNETIC METAL RIBBON COATED WITH INSULATOR

(75) Inventors: Ryusuke Hasegawa, Morristown, NJ (US); John P. Webb, Myrtle Beach, SC (US)

(73) Assignee: Metglas, Inc., Conway, SC (US)

( * ) Notice: Subject to any disclaimer, the term of this patent is extended or adjusted under 35 U.S.C. 154(b) by 59 days.

(21) Appl. No.: 10/354,791

(22) Filed: Jan. 30, 2003

(65) Prior Publication Data

US 2004/0151920 A1 Aug. 5, 2004

(51) Int. Cl.
  B32B 15/02 (2006.01)
  B32B 15/04 (2006.01)
  B32B 15/08 (2006.01)
  B32B 15/18 (2006.01)

(52) U.S. Cl. .................. 428/624; 428/458; 428/692; 336/218

(58) Field of Classification Search ................ 428/611, 428/624, 630, 632, 457, 458, 692, 900, 928; 336/218; 361/268
See application file for complete search history.

(56) References Cited

U.S. PATENT DOCUMENTS

| | | | | |
|---|---|---|---|---|
| 4,808,464 A | * | 2/1989 | Pavlik et al. | 428/216 |
| RE32,925 E | | 5/1989 | Chen et al. | 148/403 |
| 4,845,454 A | * | 7/1989 | Watanabe et al. | 336/212 |
| 4,983,859 A | * | 1/1991 | Nakajima et al. | 307/419 |
| 5,242,760 A | * | 9/1993 | Matsuoka et al. | 428/692 |
| 5,443,664 A | * | 8/1995 | Nakajima et al. | 148/307 |
| 5,470,646 A | * | 11/1995 | Okamura et al. | 428/216 |
| 5,541,566 A | * | 7/1996 | Deeney | 336/177 |
| 5,573,863 A | * | 11/1996 | Hayakawa et al. | 428/694 T |
| 5,639,566 A | * | 6/1997 | Okamura et al. | 428/692 |
| 5,780,177 A | * | 7/1998 | Tomita et al. | 428/692 |
| 6,011,475 A | * | 1/2000 | Herzer | 340/572.8 |
| 6,404,317 B1 | * | 6/2002 | Mizoguchi et al. | 336/200 |
| 2003/0150528 A1 | * | 8/2003 | Martis et al. | 148/304 |
| 2003/0226618 A1 | * | 12/2003 | Herzer et al. | 148/121 |

FOREIGN PATENT DOCUMENTS

JP    1-289228    * 11/1989
JP    3-208406    *  9/1991

OTHER PUBLICATIONS

H.G. Elias, "An Introduction to Plastics," VCH Publishers, New York, 1993, pp. 186, 187, 259, 263–265 (no month).*
Toshinori ODA et al., Patent Abstracts of Japan, "Noise Filter", Publication No.: 01289228 A, Publication Date: Nov. 21, 1989.
Takao Kusaka et al., Patent Abstracts of Japan, "Noise Filter Element", Publication No.: 03208406.A, Publication Date: Sep. 11, 1991.

* cited by examiner

Primary Examiner—Michael E. Lavilla

(57) ABSTRACT

A magnetic ribbon or sheet is coated with an electrical insulator prior to formation of a magnetic implement. Manufacture of the magnetic implement is accomplished in a single process without need for co-winding magnetic and insulator ribbons. Thermal property differences between the magnetic material and the insulator operate during heat treatment to enhance magnetic property modification of the implement.

20 Claims, 7 Drawing Sheets

MAGNETIC IMPLEMENT USING MAGNETIC METAL RIBBON COATED WITH INSULATOR

BACKGROUND OF THE INVENTION

1. Field of the Invention

This invention relates to magnetic implements for cores of transformers and inductors; and more particularly, to a magnetic implement composed of metal alloy ribbon coated with an electrical insulator and adapted for use in transformer and inductor cores that operate at high frequencies.

2. Description of the Prior Art

Magnetic cores are widely used electric power transformers that carry electrical current at low frequencies; typically less than 500 Hz. When a transformer is operated at a given frequency, it loses energy, owing in part to its magnetic loss. There are two sources for the magnetic loss: hysteresis loss, which is proportional to the frequency, and eddy-current loss, which is proportional to the n-the power of the frequency where n ranges from about 1.3 to 2. Generally, the proportionality coefficient for the eddy-current loss is proportional to the square of the core material thickness. Thus, electrically insulated, thinner magnetic materials result in lower eddy-current losses. A similar situation exists for inductors operated under an AC excitation. When the operating frequency for these transformers and inductors is low, as is the case for electric power transformers normally operated at 50 or 60 Hz, the magnetic loss due to eddy-current is relatively low compared with hysteresis loss, and some thin oxide coating on the surface of the magnetic material is sufficient to insulate the material. Magnesium oxide is widely used for the coating. However, the degree of adhesion of this oxide to the surface of a magnetic material is poor because it is in a powder form, and the powder often falls off the surface during core production.

Magnetic materials often used as core materials come in ribbon or sheet forms, which are convenient to form tape-wound or stacked cores. Recent advances made in forming magnetic ribbons and sheets include amorphous materials. These materials are conveniently produced using the teachings of U.S. Reissue Pat. RE 32925.

When a magnetic core is used at high frequencies, a better or more secure surface coating becomes necessary to ascertain effective electrical insulation between magnetic materials.

A thin, non-conductive insulator, such as paper, polymer films and the like has been commonly used for such purposes. To maximize the insulation, sufficient dielectric properties are needed for the insulator materials. Low dielectric constants and high dielectric breakdown voltages are generally preferred. These features become increasingly important when the magnetic components are operated at high frequencies and high voltages. Although the magnetic metal-insulator-magnetic metal configuration just described is widely used, the process for manufacturing that configuration is fraught with problems. Such a manufacturing process requires a special apparatus, in which a magnetic metal and an insulator in ribbon or sheet form are co-wound to produce a magnetic component having the form of a wound core. The magnetic metal-insulator-magnetic metal configuration can also be produced by an apparatus wherein a magnetic metal and an insulator are alternately juxtaposed to form a stacked core. Co-winding processes of the type described oftentimes result in punctured or torn insulators because of the sharpness of the magnetic metal ribbon or sheet.

There remains a need in the art for a method and means for producing magnetic implements suited for use in use in transformer and inductor cores that operate at high frequencies. Especially needed is a process for manufacture of magnetic implements composed of amorphous metal ribbon or sheet, which avoids puncturing and tearing of insulators during co-winding operations. Further needed, is a thermally insulated magnetic implement having improved combinations of magnetic properties induced by heat treatment.

SUMMARY OF THE INVENTION

The present invention provides a thermally insulated magnetic implement having an improved combination of magnetic properties. A ferromagnetic ribbon or sheet is coated with an insulator prior to formation of a magnetic implement. Manufacture of the magnetic implement is accomplished in a single process without need for co-winding magnetic and insulator ribbons. Thermal property differences between the magnetic material and the insulator operate during heat treatment to enhance magnetic property modification of the implement.

In one aspect, the present invention provides a method for fabrication a magnetic implement that reliably juxtaposes electrical insulation between metallic magnetic materials and simultaneously tailors magnetic properties of the implement to achieve a desired magnetic performance. The electrical insulation material applied to the surfaces of the magnetic material during fabrication of the magnetic implement is readily available in liquid form. It is coated on the magnetic material by brushing the liquid insulator thereon or passing the magnetic material through a liquid insulator bath. After the insulation material dries out, the coated magnetic material is fabricated into a magnetic implement by winding or stacking the material. The fabricated implement is then heat-treated to modify or improve its magnetic properties. The properties thus enhanced may include: magnetic anisotropy, linear BH loop behavior; reduced eddy current losses; and high AC permeability at high frequencies. When produced, the magnetic implement comprises a magnetic core composed of a magnetic ribbon or sheet coated with an electrical insulator having divergent dielectric properties and thicknesses.

In another aspect of the invention, during fabrication, a metallic magnetic material in ribbon or sheet form is selected in light of the performance specification required for the implement. Electrical insulation properties for the insulation material, such as dielectric properties and breakdown voltages are then determined. A candidate insulation material is selected and applied on the magnetic material surfaces. Selection of the magnetic metal and the candidate insulation material is governed by certain criteria, including the difference between the thermal expansion coefficients of the metal and insulating materials. This thermal expansion coefficient difference significantly affects magnetic performances of the heat-treated implements. The magnetic implements thus fabricated are especially well suited for use in pulse transformers, signal or current metering transformers, electrical chokes and high frequency electrical transformers.

BRIEF DESCRIPTION OF THE DRAWINGS

The invention will be more fully understood and further advantages will become apparent when reference is had to the following detailed description and the accompanying drawings, in which.

DETAILED DESCRIPTION OF THE INVENTION

Figure 1:
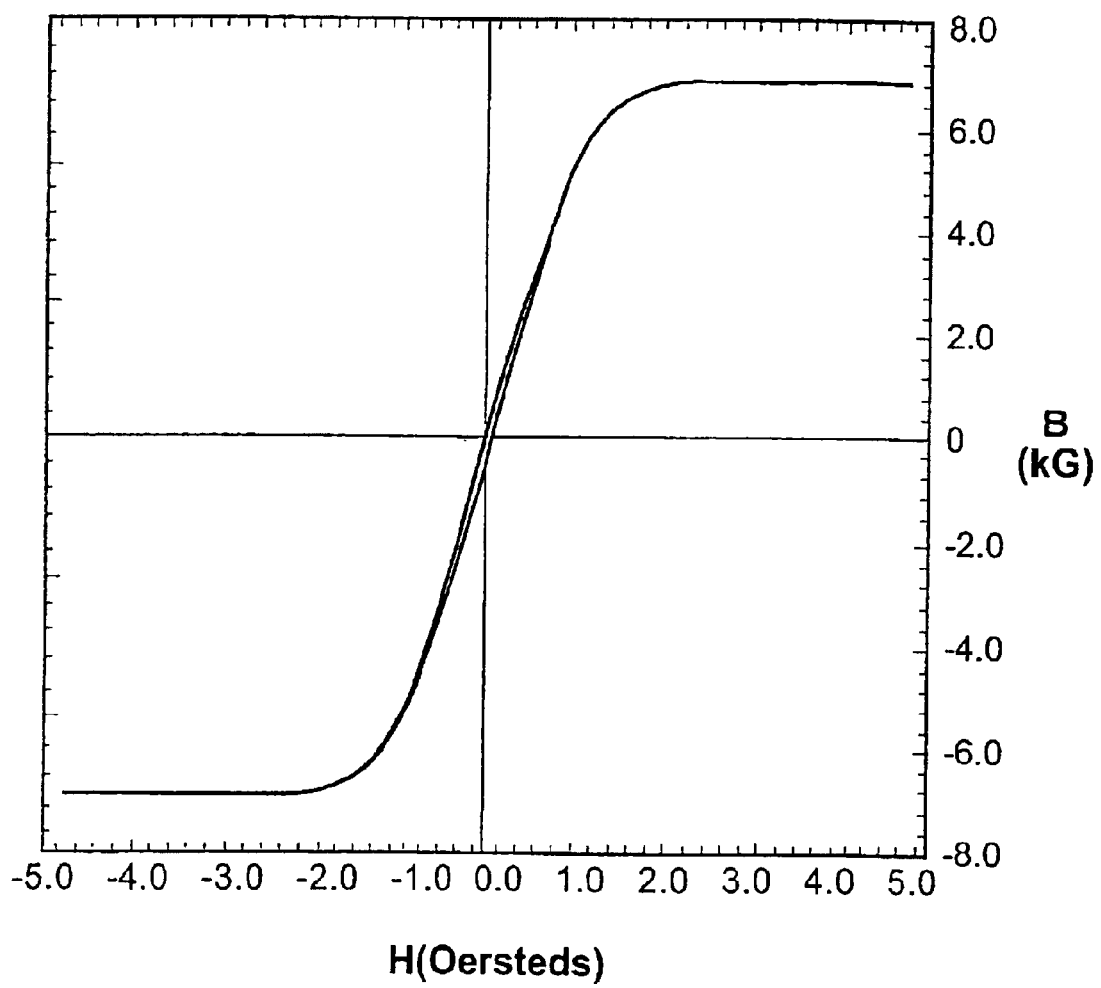
FIG. 1 is a graph illustrating the magnetization behavior of a core constructed in accordance with the present invention, the magnetic flux being shown as a function of the applied field for a core composed of cobalt-based MET-GLAS® 2705M ribbon, the core having the dimensions OD×ID×HT=102×58×25 mm, and having been heat-treated at 335° C. for 2 hours with a DC field of 1 kOe applied along the core's axis direction.
Figure 2:
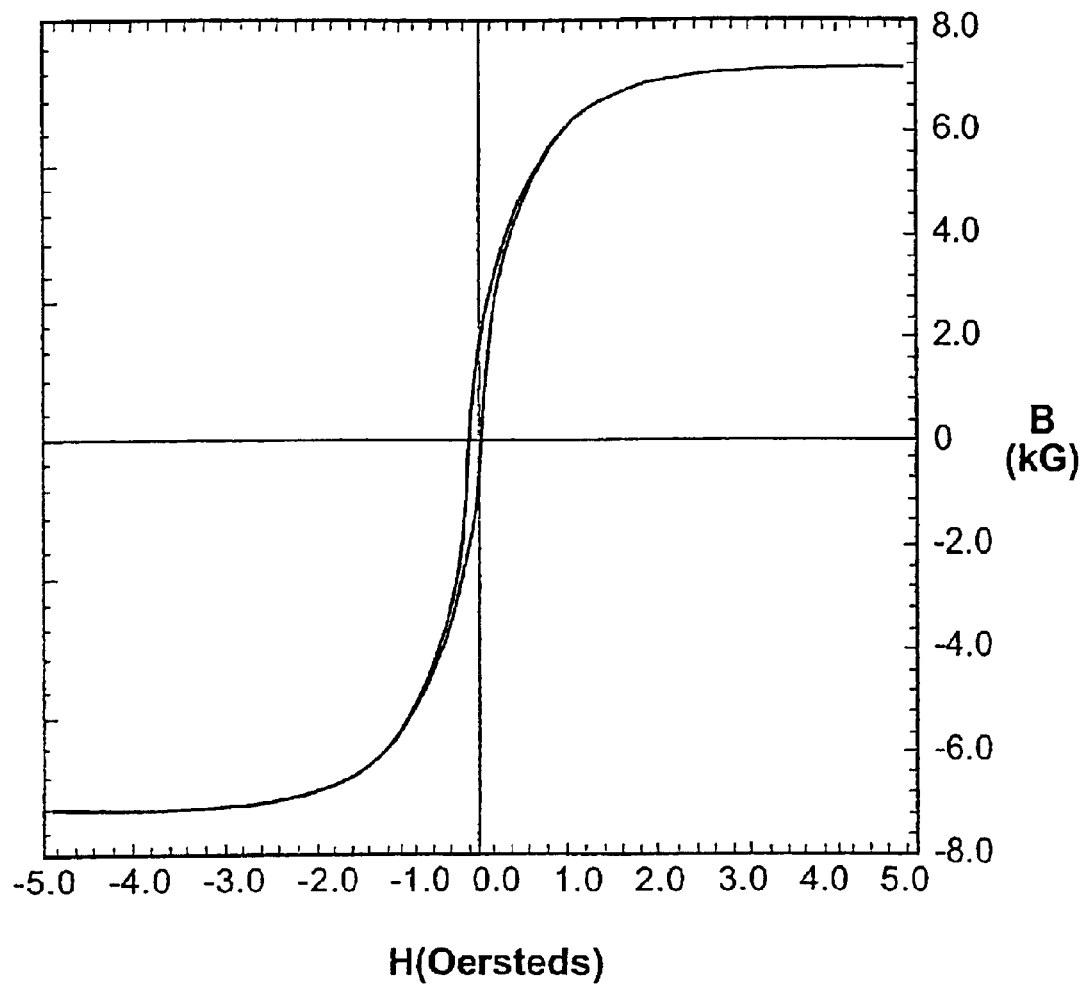
FIG. 2 is a graph illustrating the BH magnetization behavior taken at DC for a prior art core composed of uncoated METGLAS® 2705M ribbon, the core dimension and the heat-treatment condition being substantially the same as those for the core of FIG. 1.
Figure 3:
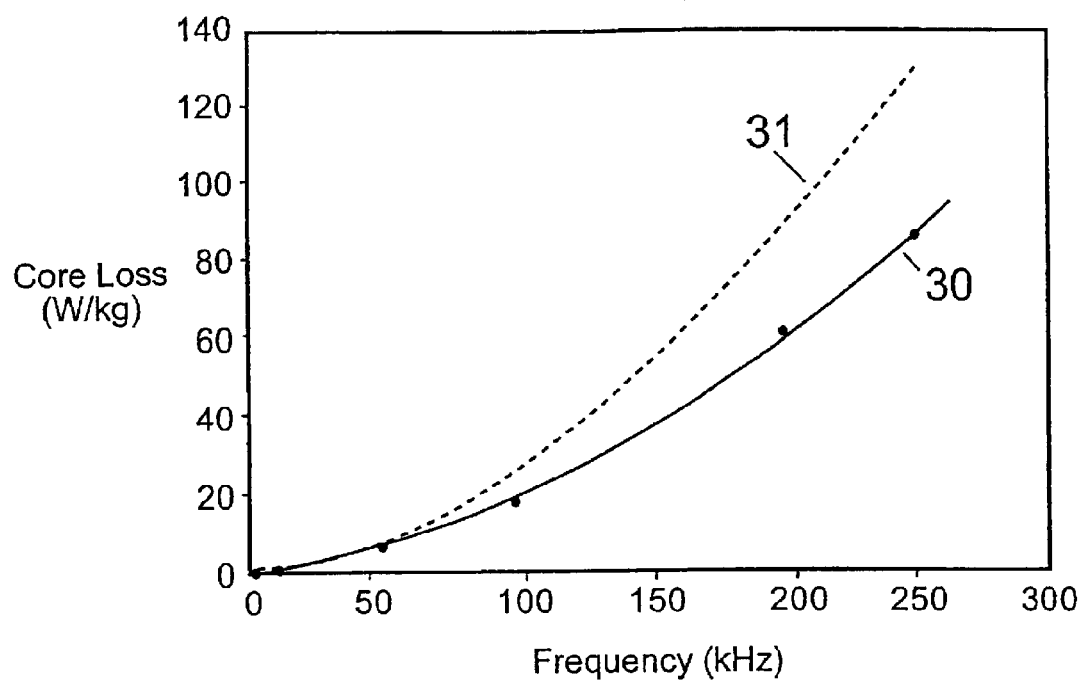
FIG. 3 is a graph depicting core loss measured at 0.1 T induction as a function of frequency for the core of FIG. 1 and the prior art core of FIG. 2.

A commercially available amorphous metal ribbon METGLAS.RTM. 2705M is coated with polyimide at Molecu Corporation, NJ. The coating thickness ranges from about 2 to about 4 µm. The dielectric constant of the coated insulator is about 3.9. The coated amorphous metal ribbon having a width of about 25 mm is wound to form toroidally shaped cores containing the dimensions OD=100–125 mm, ID=58 mm and HT=25 mm. Upon being wound, the cores were heat-treated at temperatures ranging from about 300° C. to 350° C. for 1–5 hours. This heat-treatment temperature range is selected because the alloy's Curie temperature is about 350° C. During the heat-treatment, a DC field of about 1 kOe (80 kA/m) is applied along the core's axis direction to achieve a linear BH behavior. The result taken on a core with OD=102 mm heat-treated at 335° C. for 2 hours is shown in FIG. 1. This figure reveals a relatively constant DC permeability $\mu_{dc}$ of about 5,700 up to an applied magnetic field of about 0.7 Oe (56 A/m) and a coercivity $H_c$ of about 30 mOe (2.4 A/m). To evaluate high frequency properties of this core, a 5-turn copper winding was placed on the core. At 800 kHz, an inductance of about 88 µH was obtained, indicating that the AC permeability of the core is about 1,800 at this frequency. These features indicate that this core can be used in pulse transformers, signal transformers and electrical chokes. A similar core without polyimide surface coating on the ribbon was heat-treated at 335.degree. C. for two hours with 1 kOe DC field applied along the core's axis direction as in the case of the core in FIG. 1. The result of a DC BH loop taken on this core with a field up to about 1 Oe (80 A/m) is shown by the graph in FIG. 2. The same core was rewound to insert a Mylar film between metallic layers, and a DC BH loop was taken, which was determined to be substantially identical to that in FIG. 2. As noted with reference to FIG. 2, the relatively-linear BH behavior of the core is only restricted to a low applied field of about 0.05 Oe (4 A/m), with the remanence, $B_r$, of about 1.5 kG (0.15T) and coercivity, $H_c$, of 60 mOe (4.8 A/m). The curved BH property shown in FIG. 2 is suited for certain kinds of electrical chokes, but not for pulse and signal transformers. A comparison of FIGS. 1 and 2 indicates that the polyimide coating on the surface of the ribbon helps to develop a magnetic anisotropy along the core's axis direction, resulting in the linear BH behavior of FIG. 1. Thus the insulator coating prior to the core fabrication is effective in achieving the desired magnetic properties. The electrical insulation also helps to reduce eddy current losses of the magnetic core. In addition, a low dielectric constant of about 3.9 of the polyimide insulator is responsible for the reduced component loss at high frequencies, resulting in a relatively high AC permeability of about 1800 at 800 kHz. Data set forth in FIG. 3 represents a direct comparison of the frequency dependence of the core loss 30 of a core of the present invention (shown in FIG. 1) and a core loss 31 of a core of the prior art (shown in FIG. 2). It is evident that the core of the present invention has a lower core loss above about 50 kHz, as compared to a prior art core made from the same material.

The core data illustrated by FIGS. 1 and 2 are for near-zero magnetostrictive alloys, which tend to be less subject to stresses developed during heat-treatments. When the magnetic ribbon is positively magnetostrictive, stress developed throughout the interface between ribbon and insulator due to the thermal expansion coefficient difference between the two materials plays an important role in the final magnetic state of the core.

Figure 4:
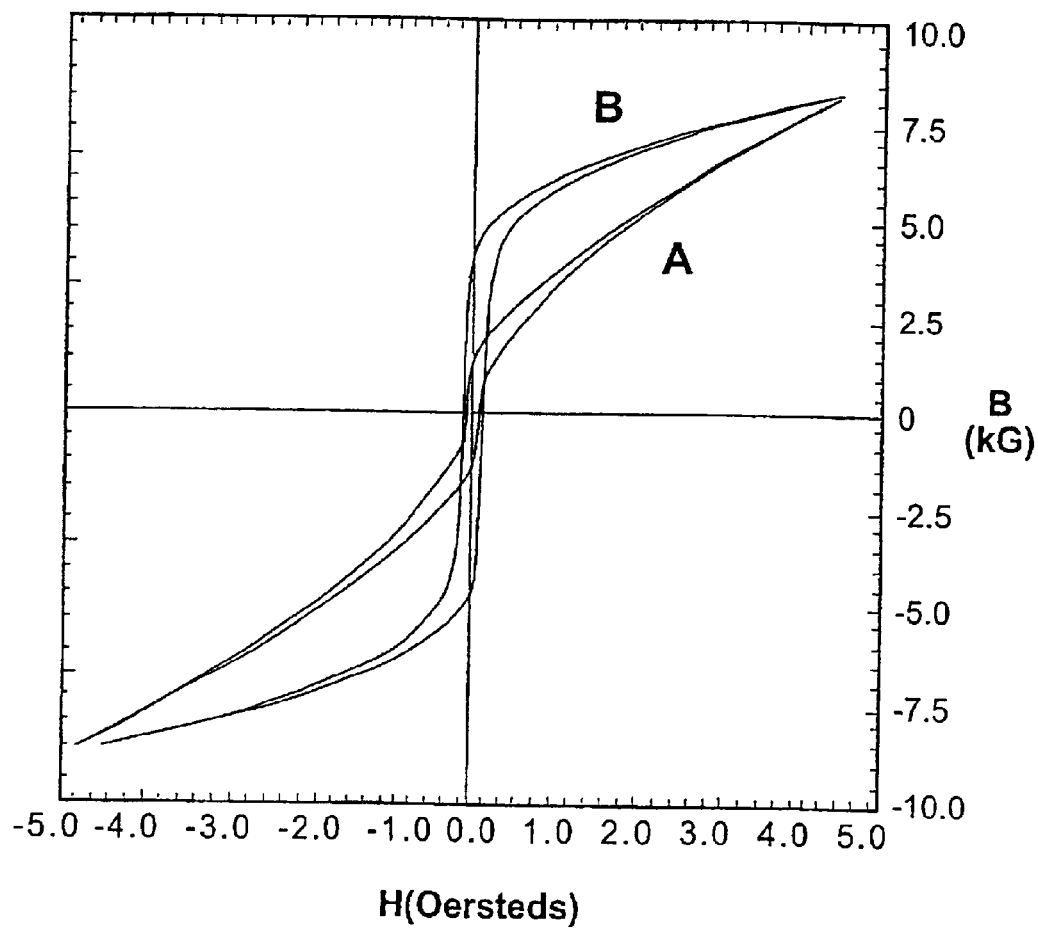
FIG. 4 is a graph illustrating the BH magnetization behaviors taken at DC for two cores of the present invention composed of iron-based METGLAS® 2605S3A ribbon, the cores having the dimensions OD×ID×HT=104×40×12.7 mm, and having been heat-treated at 390° C. for 1 hour without any applied field (curve A) and with a field of 20 Oe (1.6 kA/m) applied along the core's circumference direction (curve B)
Figure 5:
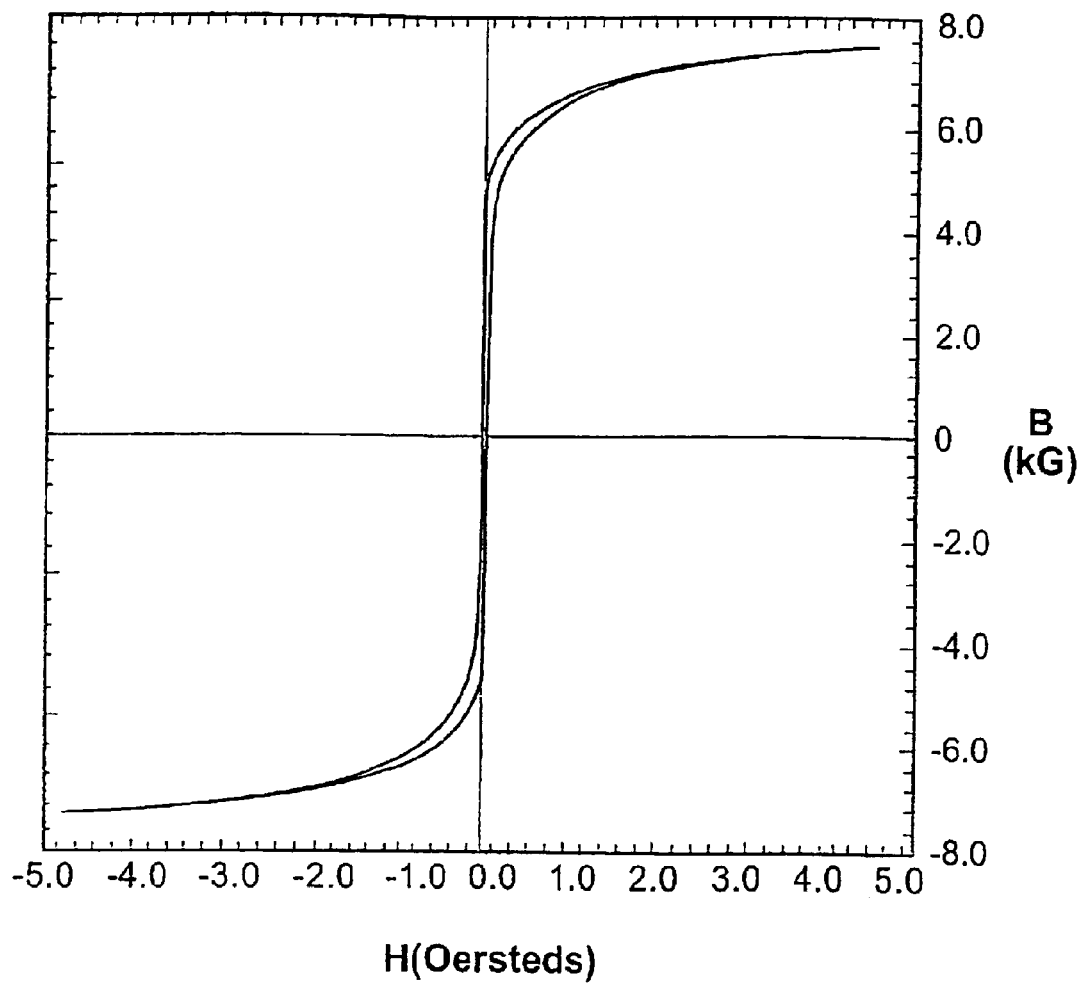
FIG. 5 depicts the BH magnetization behavior taken at DC for a prior art core composed of METGLAS® 2605S3A ribbon, the core having been heat-treated under condition substantially the same as those for the core of FIG. 4A.
Figure 6:
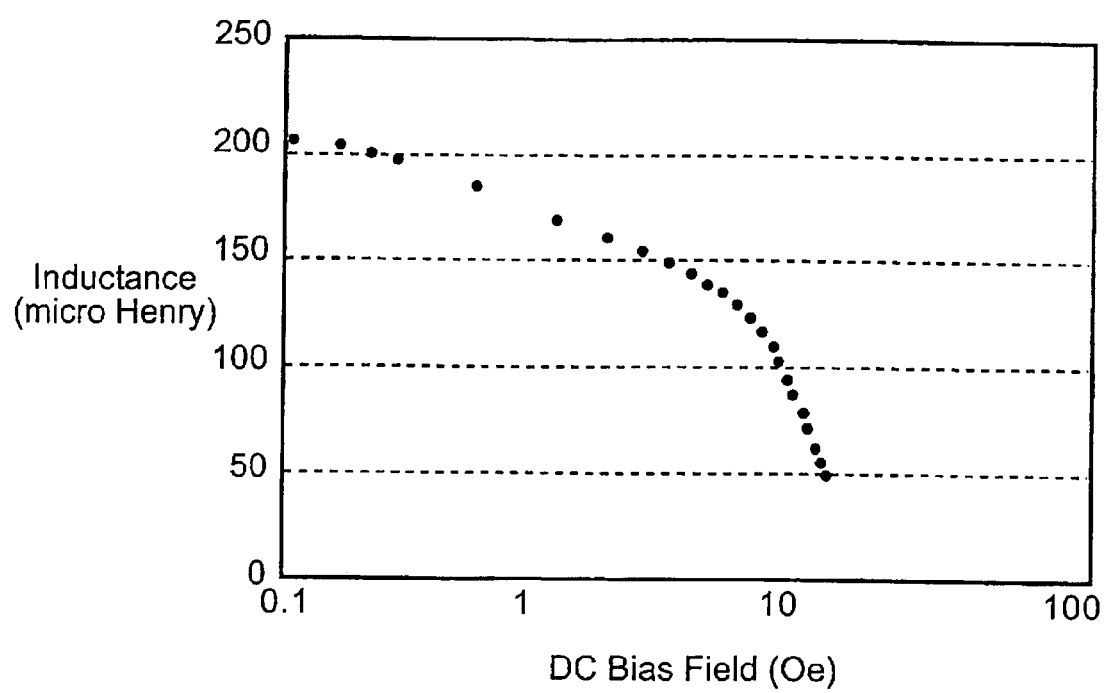
FIG. 6 is a graph depicting inductance as a function of DC bias for the cores of FIG. 4A.
Figure 7:
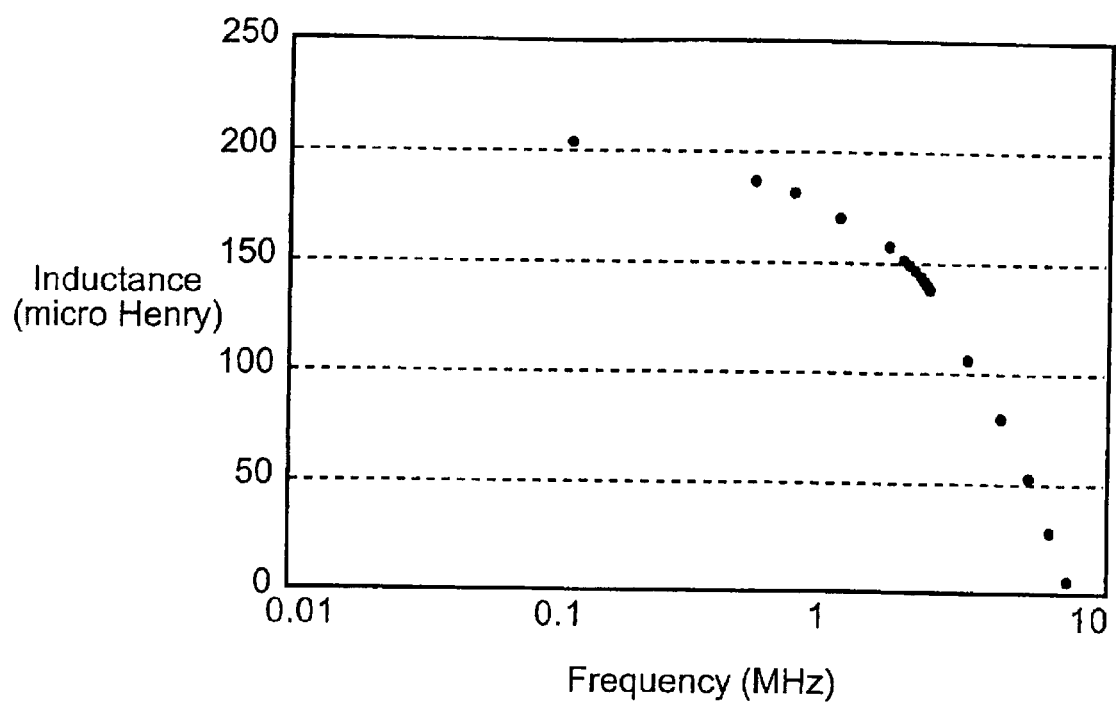
FIG. 7 is a graph depicting inductance as a function of frequency for the cores of FIG. 4A.

In FIG. 4 there are shown BH loops taken on examples wherein a positively magnetostrictive commercially available METGLAS® 2605S3A amorphous alloy ribbon is fabricated with a polyimide coating. The cores had the physical dimension OD×ID×HT=104×40×12.7 mm. Each of the cores was heat-treated at 390° C. for 1 hour without field (curve A) and with a field of 20 Oe (1.6 kA/m) applied along the circumference direction of the core (curve B). A core having the substantially the same dimensions was prepared from the substantially the same ribbon without polyimide coating and heat-treated under substantially the same conditions as the core of FIG. 4A. BH magnetization behavior of this prior art core, taken at a DC excitation, is set forth in FIG. 5. A comparison of the data contained by FIGS. 4 and 5 indicates that the magnetic anisotropy of the ribbon has been modified considerably by the polyimide coating during the heat-treatment. The modified magnetic anisotropy introduces an induced anisotropy along the axis direction of the cores. In turn, the large induced magnetic anisotropy along the core's axis direction results in a gradual change in permeability of the core material with the applied field. This result is shown in FIG. 6, wherein inductance of an inductor having the core of FIG. 4A with a 10-turn winding is plotted against applied field. Data contained by FIG. 6 indicates that an inductor core of the present invention is useful as an electrical choke. The frequency dependence of the inductance of the same inductor is shown in FIG. 7. The relatively constant inductance vs. frequency up toward 1 MHz is the result of the polyimide insulator coating on the surface of the ribbon used; such insulator reduces the eddy current loss in the core material. This indicates that this inductor can be used as a choke coil up to about 1 MHz. On the other hand, the core showing the BH behavior of FIG. 4B is suited for electrical transformers used in high frequencies such as the main transformers in switch-mode power supplies.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Sample Preparation

Commercially available amorphous materials designated METGLAS® 2705M and 2605S3A ribbon having widths of about 25 mm are coated with polyimide. The thickness of the amorphous ribbons ranges from 16–25 μm, while the polyimide layers are 2–4 μm thick. Each of the ribbons is wound to form a toroidally shaped magnetic core having the dimensions OD=100–125 mm, ID=40–60 mm and HT=10–30 mm. The wound cores are heat-treated at 300–400° C. for 1–5 hours with or without magnetic fields applied along the toroid's axis (or transverse) and circumference (longitudinal) directions. In the transverse and longitudinal field cases, the field strengths are about 1 kOe (80 kA/m) and about 20 Oe (1.6 kA/m), respectively. Cores using uncoated ribbon are prepared in the same way. Some of these cores are co-wound with Mylar films.

Magnetic Measurements

For DC hysteresis measurements, each core has 20 copper winding turns in the primary and secondary coils. A commercially available BH hysteresigraph is used to generate DC hysteresis loops on the cores. FIGS. 1, 2, 4 and 5 are representative of the BH loops taken.

At high frequencies, to avoid inter-winding capacitance the number of the primary and secondary copper winding turns is reduced to five or ten. A measurement frequency of 1 kHz–10 MHz is chosen, since it is in the operating frequency range of practical devices. A commercially available inductance bridge is used for this purpose. Data thus generated are set forth in FIGS. 6 and 7. For the core loss measurement of FIG. 3, a standard technique following the guidelines of IEEE Standards 393–1991 was used.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A magnetic implement, comprising a magnetic ribbon coated with a polyimide electrical insulator to form a bonded interface region between the magnetic ribbon and the polyimide electrical insulator and subjected to a heat treatment, the magnetomechanical properties of the magnetic ribbon and the thermal expansion properties of the insulator being operable during said heat treatment of the ribbon to enhance linearity of the BH loop of said implement.

2. A magnetic implement as recited by claim 1, wherein said ribbon comprises an amorphous metal magnetic alloy.

3. A magnetic implement as recited by claim 1, wherein said ribbon is a crystalline magnetic alloy.

4. A magnetic implement as recited by claim 1, wherein said electrical insulator has a dielectric constant below 10 and is stable at a temperature above 100° C.

5. A magnetic implement as recited by claim 1, wherein said implement has a magnetic excitation direction and said heat-treatment is carried out with an applied field along said magnetic excitation direction.

6. A magnetic implement as recited by claim 1, wherein said implement has a magnetic excitation direction and said heat-treatment is carried out with an applied field along the perpendicular direction of said magnetic excitation direction.

7. A magnetic implement as recited by claim 1, wherein said heat-treatment is carried out in the absence of an applied field.

8. A magnetic implement as recited by claim 1, wherein said thermal expansion of said insulator results in stress at the interface between said insulator and said ribbon.

9. A magnetic implement as recited by claim 1, wherein said magnetic ribbon has a near zero magnetostriction.

10. A magnetic implement as recited by claim 1, wherein said magnetic ribbon is positively magnetostrictive.

11. A magnetic implement as recited by claim 1, wherein said implement is an high frequency inductor.

12. A magnetic implement as recited by claim 11, wherein said magnetic inductor is a pulse compressor.

13. A magnetic implement as recited by claim 11, wherein said magnetic inductor is an electrical choke.

14. A magnetic implement as recited by claim 1, wherein said implement is a high frequency transformer.

15. A magnetic implement as recited by claim 14, wherein said transformer is a pulse transformer.

16. A magnetic implement as recited by claim 14, wherein said transformer is a signal transformer.

17. A magnetic implement as recited by claim 14, wherein said transformer is a current metering transformer.

18. A magnetic implement as recited by claim 14, wherein said transformer is a high frequency electrical transformer.

19. A magnetic implement, comprising a magnetic sheet coated with a polyimide electrical insulator to form a bonded interface region between the magnetic sheet and the polyimide electrical insulator and subjected to a heat treatment, the magnetomechanical properties of the magnetic sheet and the thermal expansion properties of the insulator being operable during said heat treatment of the sheet to enhance linearity of the BH loop of said implement.

20. A magnetic implement comprised of a toroidally shaped core and produced by a process comprising:

coating a magnetic ribbon with a polyimide electrical insulator, each having a thermal expansion coefficient, to form a bonded interface region between the magnetic ribbon and the polyimide electrical insulator;

winding said coated ribbon to form said toroidally shaped core; and heat treating said core, the stress developed during said heat treatment due to a difference in the thermal expansion coefficients of said insulator and said ribbon being effective to enhance the linearity of the BH loop of said core after said heat treatment.

* * * * *